Nov. 15, 1955 L. E. LYND ET AL 2,723,916
METAL TITANATE COMPOSITION
Filed Feb. 8, 1954
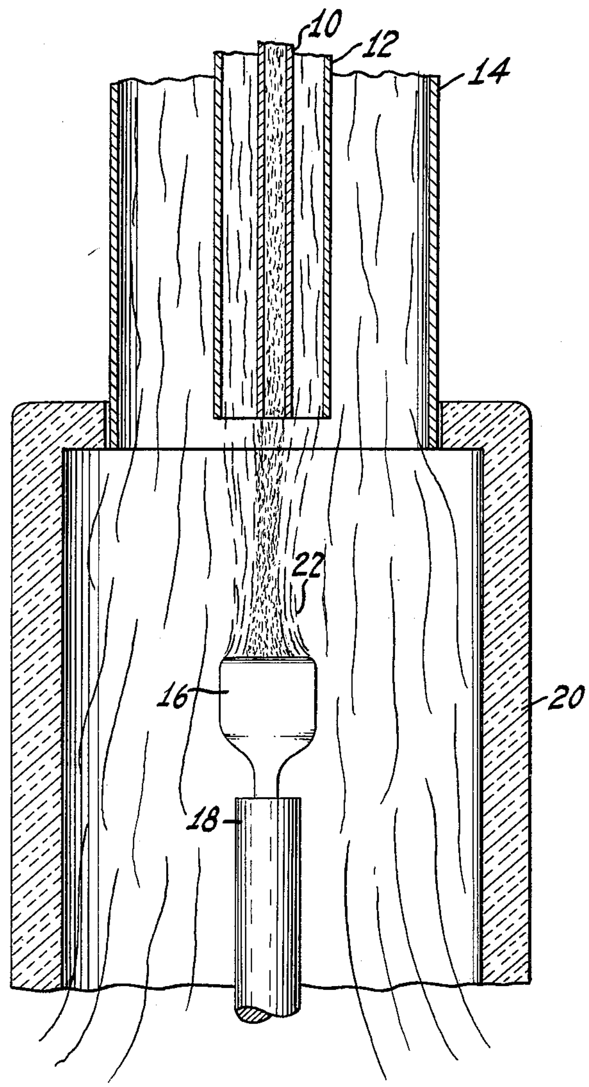
INVENTOR.
LANGTRY E. LYND
LEON MERKER
BY Charles F. Kaegebehn
ATTORNEY United States Patent Office 2,723,916

Patented Nov. 15, 1955

1

2,723,916

METAL TITANATE COMPOSITION

Langtry E. Lynd, South Plainfield, N. J., and Leon Merker, New York, N. Y., assignors to National Lead Company, New York, N. Y., a corporation of New Jersey Application February 8, 1954, Serial No. 408,835

3 Claims. (Cl. 106—42)

This invention relates to metal titanate compositions. More specifically, it relates to monocrystalline titanate compositions which are highly refractive.

Many types of materials have been produced as sintered bodies which possess relatively high refractive indices. Among these sintered bodies are barium titanate. Such bodies are prepared in various ways by sintering powdered barium titanate material. Various advantages could be obtained if barium titanate could be prepared as monocrystalline material instead of in the well-known sintered form. Various techniques have been employed to produce monocrystalline barium titanate but none has been produced prior to our investigations except in extremely small sizes. For many actual uses such small single crystals cannot be employed and therefore the sintered titanate bodies have been used instead. During our investigations on production of single crystals, we have attempted to produce many types of single crystals and among those is the metal titanate composition contemplated by the instant invention. Such massive monocrystalline metal titanate composition has not been prepared prior to the instant invention. Such material produced in massive monocrystalline form has decided advantages over the material produced by the prior art process in multicrystalline sintered form.

Many attempts have been made in the past to prepare usable size single crystals of barium titanate but all have failed. Barium titanate crystallizes in both the hexagonal and tetragonal forms. It is particularly desirable to produce large single crystals of barium titanate in the tetragonal form because of the unusual electrical characteristics which this type of crystal possesses.

An object of this invention, therefore, is to produce single titanate crystals of commercially usable size which possess unusual electrical characteristics similar to those possessed by the tetragonal form of barium titanate. Another object of this invention is to provide a process for producing such crystals. Still another object is to provide a simple and economical method for producing sizable titanate single crystals which possess such unusual electrical characteristics. These and other objects will become more apparent from the following more complete description of the instant invention.

Broadly this invention contemplates monocrystalline tetragonal titanate compositions consisting essentially of barium titanate and from about 1% to about 10% by weight, of oxidic compound selected from the group consisting of strontium and calcium, calculated as metal oxide. The present invention further contemplates the preparation of such monocrystalline titanate compositions which comprises forming an intimate mixture of finely divided barium titanate and a small amount of a compound selected from a group consisting of oxidic compound of strontium and oxidic compound of calcium, fusing said mixture to form a monocrystalline mass in the form of a boule. The finely divided mixture may be fused in an oxyhydrogen flame. The amount of oxidic

2 compound added to the barium titanate material is from about 1% to about 10%.

The terms "barium titanate" and "oxidic compounds of strontium and calcium" are intended to embrace both pure material and material which contains impurities, added coloring or modifying agents, either present or added, which are of a nature or in amount as to not affect the monocrystalline structure nor alter desired color or electrical properties of the monocrystalline material produced. In most cases the impurties are held to a minimum and ordinarily will not exceed a few tenths of a per cent, and modifying and coloring agents are added in the amount necessary to produce the desired effect.

A preferred type of apparatus which may be successfully used in the instant invention is similar in its general construction to that shown in a co-pending application assigned to the same assignee as the instant invention. The co-pending application is Serial No. 286,853, filed May 9, 1952, by Charles H. Moore, Jr., et al. The apparatus is also shown in Belgian Patent No. 491,522. The principal differences between the present preferred apparatus and those of the Moore application and the Belgian patent is in the relation of the burner and chamber and the manner in which the gases are introduced. These differences are illustrated in the drawing.

In the apparatus shown in the drawing, the burner comprises three substantially concentric tubes 10, 12, and 14. The powdered titanate mixture is introduced through the center tube 10 with a portion of the oxygen and the remainder of the oxygen is introduced through the intermediate tube 12. The hydrogen is introduced through the outer tube 14 which may be slightly longer than the tubes 10 and 12. The boule 16 is formed on a pedestal 18 of suitable refractory material such as firebrick or zirconia and, as the boule grows, the pedestal 18 is lowered so that the top of the boule always remains at about the same location in the flame.

The boule 16 and top of the pedestal 18 are surrounded by a chamber 20 of firebrick or the like and this chamber preferably surrounds the lower end of the outer tube 14. The gases are preferably fed at such rates that the flame fills and extends through the entire chamber 20 around the boule and in this way the temperature and other conditions around the boule are kept substantially constant. It has been found that smaller flames may be unsteady due to currents within the chamber and variations in the flame may cause damage to the boule.

In practice, the powdered titanate material is generally introduced periodically into the pipe 10 with a minor portion of the oxygen, and the major portion of the oxygen is introduced through pipe 12. An excess of hydrogen is introduced through the pipe 14 to provide the proper temperature and large flame. In one burner the oxygen in the inner pipe 10, the oxygen in the intermediate pipe 12 and the hydrogen in the outer pipe 14 are introduced in the proportions 3:3:13 respectively.

A cone 22 forms within the flame below the pipes 10 and 12 and the pedestal 18 is preferably positioned so that the molten top of the boule 16 is at or near the point of the cone 22. In order to start such a single crystal to form it is desirable, but not necessary, to first form a seed on the pedestal and then gradually build up the amount of molten material on the seed to form the crystal. Such a procedure allows the crystal to build up upon itself, gradually increasing in diameter, until a boule or carrot-shaped single crystal of titanate composition is formed. The size of the orifices of the oxygen-hydrogen torch determines the size of the intensely heated zone which, in turn, determines the diameter of the carrot-shaped crystal produced.

In order to fuse the powdered mixture to form a boule it has been found that the temperature of the flame should be maintained somewhat above the melting point of the titanate feed material, but should not exceed a temperature where the molten material tends to flow over the edges of the pool at the top of the boule. The flame temperature may be maintained by adjusting the quantity and rates of flow of both the hydrogen and oxygen gases but it is important that the flame be kept as constant and quiet as possible. The temperature should be held between about 1600° C. and 1725° C. preferably between about 1625° C. and 1700° C.

It is preferred to employ the titanate mixture in finely powdered form. The titanate starting material should be substantially free from objectionable or incompatible impurities which detrimentally affect the crystal structure or the color or other properties of the crystal. Starting material should be finely divided and fairly uniform in size. For most efficient results, the titanate starting material should possess an open structure with units capable of being rapidly melted. A titanate starting material having an ultimate unit particle size of less than 1 micron has proved especially satisfactory. Aggregates of these small particles greater than 100 mesh should also be avoided as they do not tend to melt completely. The feed material should be free-flowing in order to feed properly.

Using an oxygen-hydrogen burner having concentric orifices, the center orifice carrying the oxygen gas and powdered titanate feed material entrained in the oxygen, the intermediate orifice carrying the rest of the oxygen gas, and the outer orifice carrying the hydrogen gas, a single crystal boule of titanate composition was prepared. The total gas flow of oxygen was 9 liters per minute, 4 liters through the center orifice and 5 liters through the intermediate orifice, while the flow of hydrogen was 40 liters per minute. The boule was then subsequently annealed in an oxidizing atmosphere, such as air, for example, at temperature between 650° C. and 1550° C. to remove the strains, and the annealed boule possessed a clear, substantially colorless appearance. The time of annealing varies upon the size of the boule and the temperature employed. However, it has been found that from 12 hours to 180 hours are satisfactory for producing relatively strain-free, transparent, substantially white crystals.

Such a transparent mass of monocrystalline material may be shaped for various purposes such as, for example, dielectric amplifiers, memory devices, amplitude and frequency modulators, and demodulators, frequency converters, phase shifters, harmonic generators, and high quality piezoelectric devices.

Substantially any oxidic compound of either strontium or calcium may be added to the feed material provided it does not adversely affect the color nor the electrical properties desired. The most convenient compounds to add include oxides, carbonates, or titanates of either strontium or calcium. These oxidic compounds may be added to the barium values either during or after the preparation of the barium titanate feed material. The amount of oxidic compound of either the strontium or calcium should lie between about 1% and about 10% by weight, calculated as the metal oxide.

The monocrystalline tetragonal titanate compositions produced have an average index of refraction at 25° C. of 2.40 with a reciprocal relative dispersion below 20 and a birefringence of 0.055 at 25° C. With respect to its electrical properties, the crystal has at 25° C. and at low field strength a dielectric constant of 160 parallel to the C axis, and about 100,000 parallel to the A axis. The spontaneous polarization at 25° C. is about 25 microcoulombs per square centimeter. The coercive field is 500 volts per centimeter and its Curie temperature is from 80° C. to 120° C.

From the above description, it is apparent that the present invention provides monocrystalline tetragonal titanate compositions having a high index of refraction and unusual electrical properties. These single crystals of titanate composition are massive and therefore may be used for many electrical purposes, more effectively than are obtained by using sintered barium titanate bodies. The process is simple and economical to employ to produce massive monocrystalline material.

While this invention has been described and illustrated by the examples shown, it is not intended to be strictly limited thereto, and other modifications and variations may be employed within the scope of the following claims.

We claim:

1. Monocrystalline tetragonal titanate composition of commercially usable size consisting essentially of barium titanate and from about 1% to about 10% by weight of compound selected from the group consisting of oxidic compound of strontium and oxidic compound of calcium calculated as the metal oxide, said composition characterized by a clear uniform appearance and a high index of refraction.

2. Composition according to claim 1, in which said compound is oxidic compound of strontium.

3. Composition according to claim 1, in which said compound is oxidic compound of calcium.

References Cited in the file of this patent

UNITED STATES PATENTS

| | | |
|---|---|---|
| 988,230 | Verneuil | Mar. 28, 1911 |
| 2,420,692 | Wainer | May 20, 1947 |
| 2,494,699 | Forrester et al. | Jan. 17, 1950 |
| 2,591,561 | Lester et al. | Apr. 1, 1952 |
| 2,610,129 | Eversole et al. | Sept. 9, 1952 |

FOREIGN PATENTS

| | | |
|---|---|---|
| 662,782 | France | Mar. 25, 1929 |